United States Patent [19]
Whitesel

[11] Patent Number: 5,643,065
[45] Date of Patent: Jul. 1, 1997

[54] INDEXING MECHANISM FOR ROTATABLY MOUNTED WORK HOLDING SPINDLE

[76] Inventor: Lowell E. Whitesel, 6243 Clover Valley Rd., Johnstown, Ohio 43031

[21] Appl. No.: 630,992

[22] Filed: Apr. 12, 1996

[51] Int. Cl.⁶ .................................................. B24B 41/06
[52] U.S. Cl. ............................................. 451/403; 451/404
[58] Field of Search ..................................... 451/403, 404, 451/374, 375

[56] References Cited

U.S. PATENT DOCUMENTS

| | | | |
|---|---|---|---|
| 2,296,731 | 9/1942 | Mustonen | 451/224 |
| 2,428,248 | 9/1947 | Strong | 451/400 |
| 2,664,641 | 1/1954 | Parnet . | |
| 2,785,579 | 3/1957 | Benjamin et al. . | |
| 3,039,244 | 6/1962 | Vickerman . | |
| 3,090,633 | 5/1963 | Farnsworth . | |
| 3,125,904 | 3/1964 | Olivieri . | |
| 3,298,681 | 1/1967 | Youngblood . | |
| 3,488,894 | 1/1970 | Green | 451/403 |
| 3,583,261 | 6/1971 | Sheppard . | |
| 3,887,202 | 6/1975 | Zapart . | |
| 5,303,511 | 4/1994 | Tsuchiya et al. . | |

*Primary Examiner*—James G. Smith
*Assistant Examiner*—Derris H. Banks
*Attorney, Agent, or Firm*—Francis T. Kremblas, Jr.

[57] ABSTRACT

An indexing and rotational feed control apparatus for a rotationally mounted spindle holding a work piece includes an indexing housing connected to the spindle and carrying an indexing finger is rotatably mounted relative to an indexing plate such that rotation of the indexing wheel provides sequential releasably fixed rotation of the spindle between angularly indexed positions. The indexing plate is connected to a shaft which in turn is connected to a rotary actuator such that rotation of the actuator permits precise rotation of the indexing wheel and indexing housing in either direction without disturbing the releasably fixed indexed position between the spindle and indexing wheel as set by the releasably fixed engagement between the indexing finger and the indexing wheel.

5 Claims, 4 Drawing Sheets

INDEXING MECHANISM FOR ROTATABLY MOUNTED WORK HOLDING SPINDLE

TECHNICAL FIELD

The present invention relates to an indexing and feed control of the rotary mounted spindle supporting a workpiece and particularly to an improved indexing and rotational feed control apparatus which permits more flexible rotational feed of the workpiece into contact with a grinding wheel.

BACKGROUND OF THE INVENTION

There are many prior art indexing arrangements for releasably fixing the angular relationship between a rotatably mounted spindle and a workpiece mounted on the spindle. In particular, conventional work-holding heads for mounting on a manually or hydraulically operated conventional grinding machine typically have an indexing plate provided on the spindle to permit releasably fixing the angular relationship of the spindle and hence the workpiece held on an end of the spindle to do particular grinding work on the workpiece.

However, in most machine shop applications and particularly in those applications involving grinding or re-grinding fluted tooling, (i.e. taps, hobs or other form-relieved tooling) a special fixture has been employed wherein a fixed, biased finger is mounted on or near the work head of the machine for engagement with the conventional circumferentially spaced recesses or teeth on the indexing wheel or plate connected to the spindle. In such operations, the operator is required to control the rotational feed of the workpiece into engagement with a grinding wheel relatively movable along the longitudinal axis of rotation of the workpiece for several passes until the necessary amount of material has been removed from the fluted cutting edge of the tool to restore the cutting edge and its original geometry.

Rotational feed control of the spindle in this particular arrangement is limited because the indexing plate is directly fixed to the spindle and by the nature of the indexing mechanism structure which relies upon movement of the biased indexing finger within a given indexing recess. This provides very limited rotation of the spindle in either direction while the finger is at least partially disposed within the recess. Rotational feed control in one direction is limited by the required engagement between the finger and indexing recess. Rotation in the opposing direction is limited to the position of the biased finger when it reaches the bottom of the indexing recess. This latter position prevents or blocks further rotation in that direction which essentially defines the fixed indexed relationship.

While there have been many attempts over several decades in the prior art to improve indexing function, such as providing greater flexibility in the number of angular rotational indexed positions provided, there has been a lack of a satisfactory device which provides positive indexing and rotational feed control while maintaining a fixed position between the indexing finger and the engaged circumferentially spaced recesses in a simple, efficient, and economical manner.

BRIEF DISCLOSURE OF INVENTION

The present invention relates particularly to an indexing and rotational feed control apparatus for a rotationally mounted spindle adapted to releasably hold a workpiece in a plurality of accurately maintained rotational positions.

In accordance with the present invention, an indexing and rotational feed control arrangement is disclosed which includes an indexing housing mounted to a work-holding spindle such that rotation of the housing carrying the spindle causes rotation of the spindle. The indexing housing is provided with an indexing finger fixed to the housing. An indexing plate, disposed within the indexing housing, is provided with circumferentially spaced recesses and is fixed to a shaft upon which the indexing housing is rotatably mounted to permit sequential releasably fixed engagement between the fixed indexing finger and the recesses of the indexing plate upon rotation in one rotational direction. The shaft and indexing plate are connected to a rotary actuator, preferably in the form of a worm wheel and worm gear arrangement. The worm gear is fixed to the grinding head housing which rotatably supports the workpiece. Upon rotation of the worm gear, the worm wheel connected to the shaft carrying the index plate, the indexing housing, via the engagement between the biased indexing finger and the recesses of the indexing plate, and the work-holding spindle may be caused to rotate about the axis of the shaft as a unit in either direction. However, the indexing housing carrying the indexing finger may be independently rotated in one direction relative to the indexing plate by overcoming the bias force maintaining the indexing finger within a given one of the recesses in the indexing plate to rotate the spindle to selected angular positions relative to the indexing plate.

The rotational feed control of the present invention permits a 360 degree rotational movement of the spindle while maintaining the releasably fixed indexed relationship between the spindle and indexing plate to provide more efficient, facile, and positive manipulation of the workpiece during the grinding process of the flutes. It also permits the grinding of either opposing face of the flute using the same configuration which is not accommodated by the conventional indexing arrangement which has been used for many years in connection with such manually operated grinding operations.

Therefore the present invention provides a novel indexing and rotational feed arrangement for a rotatably mounted spindle which allows the operator to index the spindle and the workpiece to a plurality of releasably fixed angular relationships and independently rotate the spindle and workpiece in either rotational direction to control the rotational feed of the workpiece into engagement with a grinding wheel without disturbing the precise indexed angular relationship of the spindle and workpiece to the indexing plate.

Further, the indexing mechanism of the present invention is constructed in a manner which permits it to be easily mounted to an existing conventional grinding head in an easy and simple manner or to be incorporated easily into the original manufacture of an otherwise conventional grinding head and spindle assembly.

DETAILED DESCRIPTION OF A PREFERRED EMBODIMENT

Figure 1:
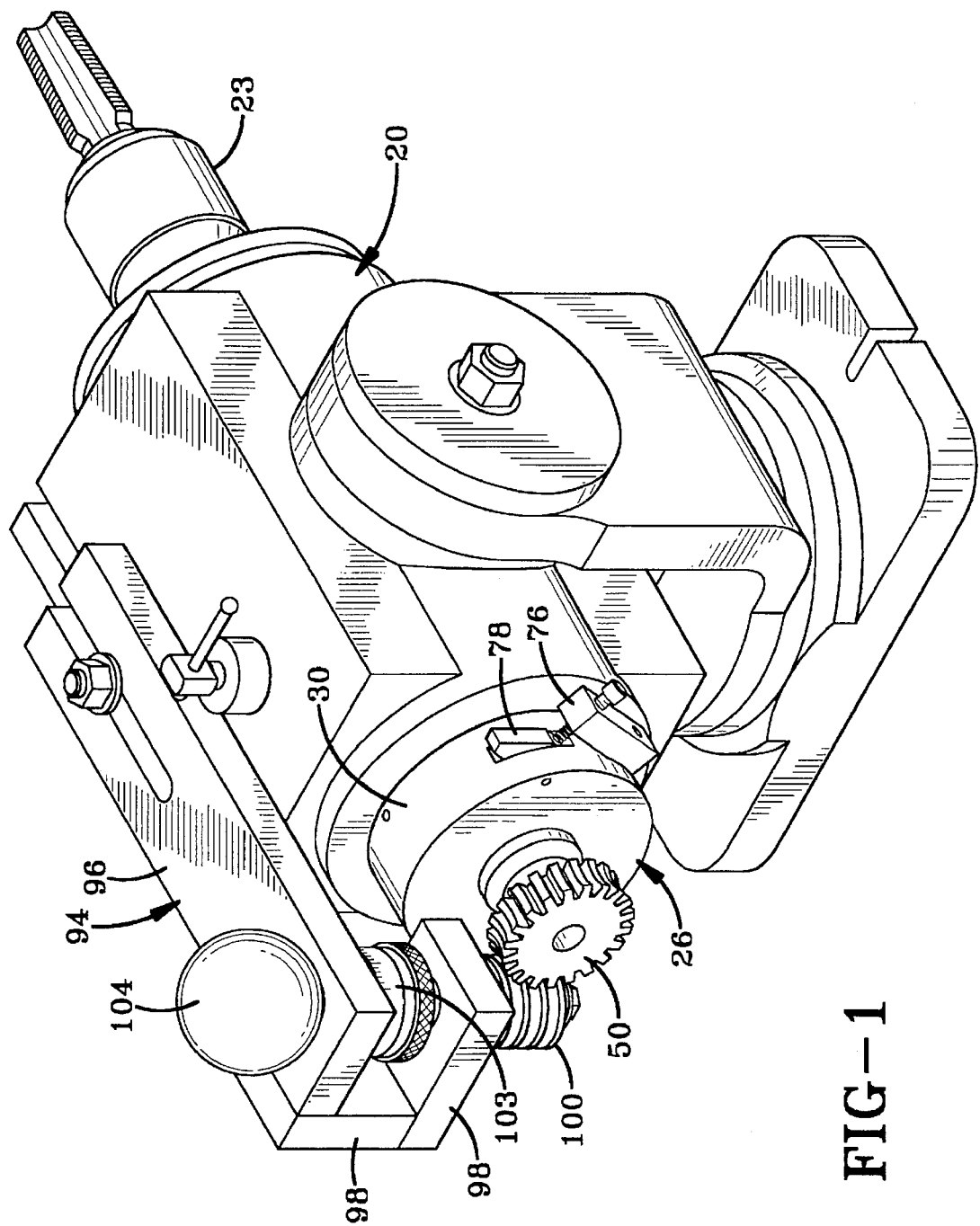
FIG. 1 is a side elevational view of typical manually operated grinding head configuration which rotationally supports a workpiece holding spindle shown in combination with an indexing and feed control arrangement constructed in accordance with the present invention.

A conventional work head, indicated generally at 20, which rotatably supports a work-holding spindle 22 is illustrated in FIG. 1. An indexing and rotational feed assembly, indicated generally at 26 and constructed in accordance with the present invention, is shown in FIG. 1 operatively mounted to grinding head 20. One end of spindle 22 is conventionally provided with an adjustable chuck 23 or an equivalent tool holding means for releasably holding a workpiece on one end of spindle 22.

Work head housing 20 is conventionally adapted for mounting on a conventional work table, not shown, capable of transverse positional alignment of the head 20 relative to a grinding wheel, not shown, mounted in a fixed position relative to the work table. Further, such a work table includes means for controlled reciprocal movement of the work head toward and away from the grinding wheel, in a manner well-known to those skilled in the art.

In the case of form-relieved tools, such as a fluted tap or hob for example, the work head and associated spindle are aligned for reciprocal movement along the axis of spindle 22 into engagement with the grinding wheel to face grind the flutes of the new or used internal threads of a tap, for example, to manufacture or restore the tool geometry.

To accomplish this grinding work, it is necessary to maintain the workpiece held by the spindle 22 in a plurality of accurate angular rotational positions corresponding to the faces of the flutes or other surfaces to be ground. This has priorly been accomplished by an indexing plate fixed to the spindle and a special fixture typically mounted on the work table adjacent to the indexing plate and carrying a biased finger aligned to engage recesses or teeth circumferentially spaced on the periphery of the indexing plate as the indexing plate and spindle is rotated past the fixed position of the indexing finger.

Such an arrangement provides accurate rotational positioning of the spindle and workpiece as set by the engagement between the indexing plate and finger. The finger and recess are conformed to permit rotation of the spindle a full 360 degrees in only one direction. This arrangement conventionally permits only very limited rotational feed control of the spindle and workpiece during the grinding process in which material is removed from the surface being ground during each pass into engagement with the grinding wheel. This limited degree of rotational feed control is associated with a limited degree of movement of the indexing finger within the recess of the indexing plate which is permitted without total disengagement between the finger and a respective recess. The limitations of this conventional indexing arrangement described also do not facilitate or enhance maintaining the precise geometry of the face-rake of each flute ground in a consistent manner because the indexing position is not fixed independent of the rotational movement or feed of the spindle and tool during the plural passes of the tool into contact with the grinding wheel during the grinding operation.

Figure 2:
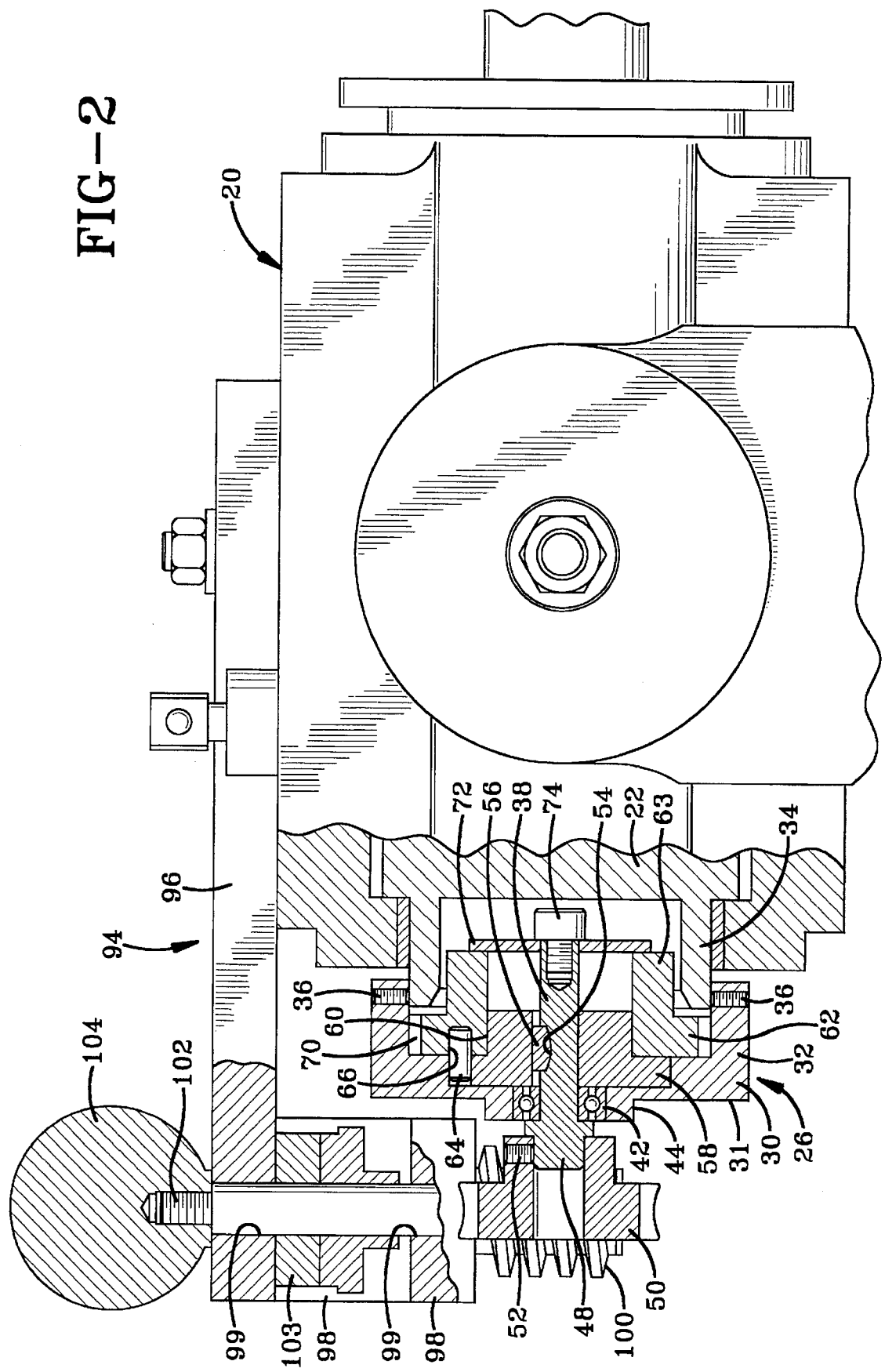
FIG. 2 is a partial side elevational view of the apparatus shown in FIG. 1, in section, illustrating the indexing and feed control arrangement constructed in accordance with the present invention, the section being taken along line 2—2 as shown in FIG. 3.
Figure 3:
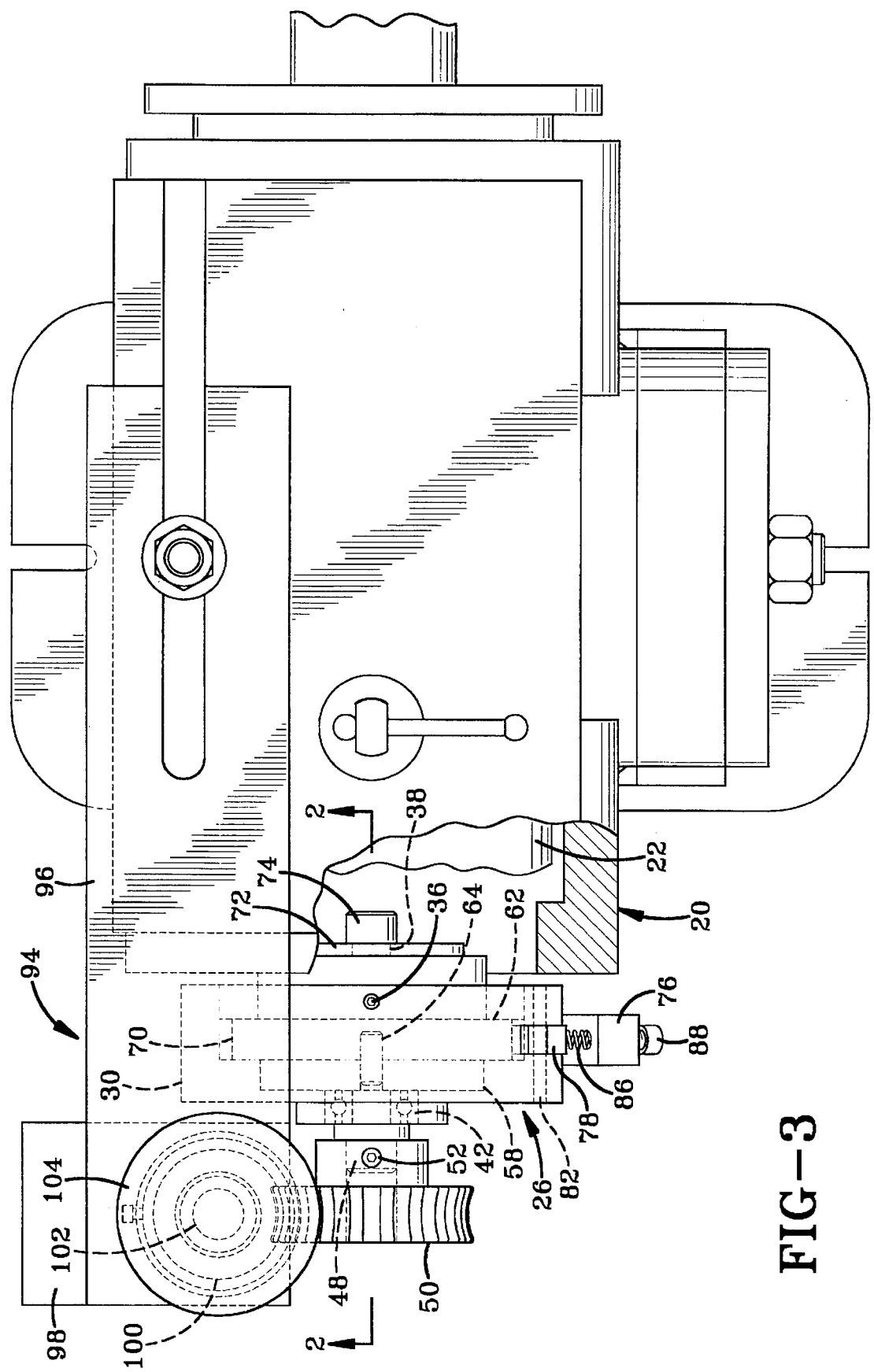
FIG. 3 is a top plan view of the portion of the portion of the apparatus shown in FIG. 2.
Figure 4:
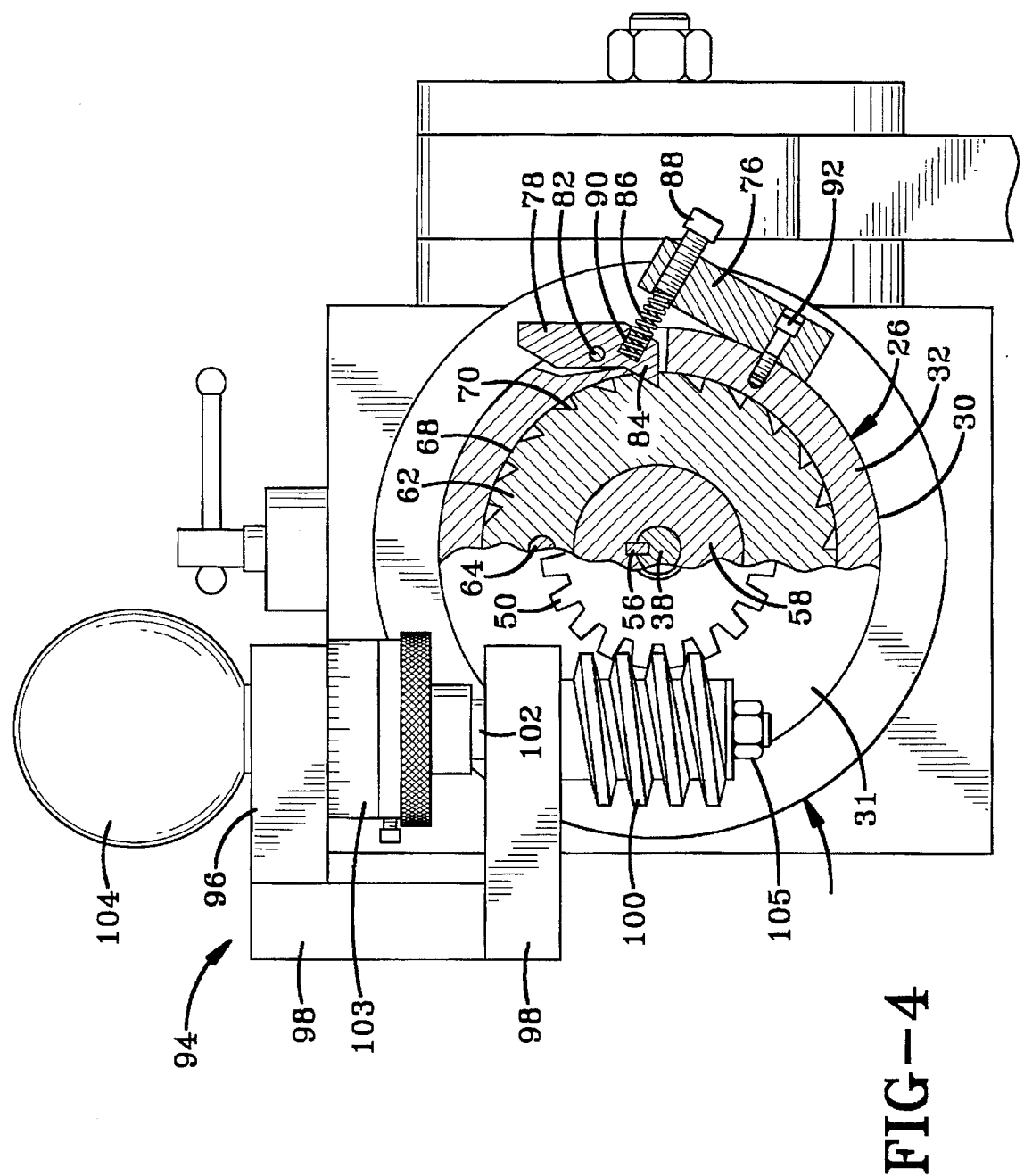
FIG. 4 is an end elevational view, partially shown in section, of the portion of the apparatus shown in FIG. 2.

As shown in FIG. 1, an indexing and rotational feed control assembly constructed in accordance with the present invention, is indicated generally at 26 and is adapted to be mounted to the opposing end of spindle 22 relative to the end carrying the workpiece holding chuck 23. With reference to FIGS. 2–4, the details of the construction of assembly 26 are illustrated and include an indexing housing 30 which is provided with a centrally disposed open-end defined by an annular flange 32. Housing 30 is fixed to the outer bearing 34 formed on the opposing end of spindle 22 relative to chuck 23 by a set screw 36. Therefore, housing 30 and spindle 22 are connected to rotate as a unit.

A shaft member 38 is extended through housing 30 which is rotatably supported on shaft 38 through an opening in the rear wall 31 of housing 30 by a bearing ring 42 mounted within an annular flange 44 preferably integrally formed in rear wall 31. The rearward end of shaft 38 includes an enlarged collar 48 which abuts against flange 44. A worm wheel 50 is mounted on the rearward end of shaft 38 extending outwardly from housing 30 and is fixed to shaft 38 via a set screw 52.

Shaft 38 includes a keyway 54 for receiving a key 56 pressed into keyway 54. An index plate carrier 58 having a central bore adapted to slideably receive shaft 38 is positioned adjacent the inner side of rear wall 31. Carrier 58 includes a complementary keyway for accepting key 56 such that carrier 58 is fixed against rotation relative to shaft 38.

Carrier 58 includes an annular shoulder portion 60 which is conformed to slideably accept a bore provided in an annular indexing plate 62 as best seen in FIG. 2. Indexing plate 62 is fixed against rotation relative to carrier 58 via a pin 64 pressed into a suitable hole in carrier 58 and received in an aligned pin slot or hole 66 provided in index plate 62.

As best seen in FIG. 4, index plate 62 includes a peripheral surface 68 provided with a plurality of recesses 70 in predetermined circumferentially spaced relationship to one another to define a plurality of predetermined rotational angular positions.

Index plate also includes a forwardly extending annular shoulder portion 63. A washer 72 abuts against the forward face of collar portion 63 and is secured by a threaded cap member 74 which is threadably received in a threaded hole provided in the forward end of shaft 38 to secure the assembled components together within housing 30 in operational relationship.

As best seen in FIGS. 2 and 4, a tensioner housing 76 is mounted on housing 30 and carries an indexing finger 78 which is pivotally mounted on a pin 80 inserted into a conforming hole 82 provided in finger 78 and includes a forward end 84 extending through an opening in housing 30. End 84 is configured and aligned to engage the peripheral surface 68 of indexing plate 62. A biasing force is applied to the forward end 84 by a spring 86 carried by an adjuster screw 88 threadably mounted in a hole in tensioner housing 76 and extending into an opening 90 provided in finger 78. Spring 86 causes finger 78 to drop into and biased engage a respective recess 70 upon rotation of housing 30 carrying finger 78.

A second threaded member 92 is provided and extends through tensioner housing 76 and into a suitable threaded hole provided in indexing housing 30 to secure of tensioner housing 76 and finger 78 to housing 30.

It should be readily understood by one skilled in the art that the bias force applied by spring 86 against the end 84 of finger 78 can be adjusted by rotation of member 88 to vary the applied force necessary to permit finger 78 to rotate about pin 82 upon counterclockwise rotation of housing 30 relative to indexing plate 62 in order to become disengaged from a respective recess 70.

It should be noted that finger 78 and the position of pin 82 are conformed to cooperate with the configuration of recess 70 in such a manner that only unidirectional rotation of housing 30 relative to indexing plate 62 is permitted to advance finger 78 to the next adjacent recess 70 upon application of a sufficient force to overcome the force exerted by spring 86 on end 84 of finger 78.

This cooperative structure is capable of accurately locating and biasly fixing the angular rotational relationship of housing 30 and spindle 22 to indexing plate 58, but does not allow rotation of housing 30 and spindle 22 relative to indexing plate 58 in a clockwise direction as seen in FIG. 4. It should be noted that this arrangement could be reversed by changing the configuration of finger 78 and recesses 70, if desired, to change the allowed unidirectional rotation of housing 30 relative to indexing plate 62.

Worm wheel 50 is operatively engaged by a worm gear 100 fixed to a shaft 102 rotatably mounted in a bracket assembly, indicated generally at 94.

Bracket assembly 94 includes a bar 96 which may be fixed to grinding head housing 20 in any conventional manner. Bar 96 supports a pair of support members 98 forming an "L" shape fixed to bar 96. A pair of locator holes 99 are disposed in bar 96 and the horizontal member 98 through which worm gear shaft 102 is rotatably mounted. A turning knob 104 may be fixed to the upper end of shaft 102 in any conventional manner. Worm gear 100 is slideably received upon shaft 102, keyed against rotation and secured by a threaded nut and washer combination 105 to a threaded portion of shaft 102 in a conventional well-known manner.

It is preferred to attach a micrometer scale such as indicated at 103 onto shaft 102 so that the amount of rotation, as controlled by knob 104, in micro-inches can be readily observed by the operator.

From the foregoing description it should be readily understood by one skilled in the art that upon rotation of indexing housing 30 in a counterclockwise direction, as seen in FIG. 4, spindle 22 may be rotated between a plurality of releasably fixed indexed positions as dictated by the engagement between finger 78 and respective one of recesses 70 in indexing plate 62. Shaft 38, indexing plate 62, and carrier 58 are held against rotation by the engagement between worm wheel 50 and worm gear 100.

It should also be readily apparent that at any particular indexed position as set by the engagement between finger 78 and one of the recesses 70, knob 104 may be rotated freely in either rotational direction to rotate shaft 102 and worm gear 100, which in turn, causes rotation of worm wheel 50. Since shaft 38 is fixed to indexing plate 62 and housing 30 is biasedly fixed to indexing plate 62 via finger 78 and one of recesses 70 and is also fixed to spindle 22, rotation of shaft 102 and worm gear 100 may be used to rotate housing 30, all of the indexing components and spindle 22 through 360 degrees in either rotational direction without disturbing the indexed position set by the engagement between finger 78 and indexing plate 62.

This free rotational movement in either direction described above, independent of the indexed engagement which sets the angular relationship between spindle 22 and indexing plate 62, is most advantageous to provide more precise and positive rotational feed control of the spindle 22 and the workpiece held thereby during the grinding operation.

In the preferred use of the present invention, the operator uses turning knob 104 to first rotate spindle 22 away from a particular indexed position. Then the operator rotates knob 104 to rotate spindle toward engagement with the grinding wheel in a facile manner at the initiation of the each pass of the workpiece into engagement with the grinding wheel.

After the required number of passes have been made to finish grinding the face of the first flute, the operator records the preselected point of the micrometer dial 103 at the start and finished positions which indicates the amount of material removed from the face of the flute. With the tool drawn away from the grinding wheel, the operator merely rotates knob 104 to its original stating position and rotates housing 30 and attached finger 78 to the next indexed position desired to properly align the next flute to be ground. The grinding process described above is then repeated until the same finished position is indicated on the dial 103. In this manner each flute can be ground in the same manner to more consistently maintain the geometry of the face rake of each flute as required by the particular original tool design.

Further, it should also be noted that since the rotational feed control effected by rotation of knob 104 is possible in either direction, either face of the flute on the tool may be ground without changing the orientation of the indexing mechanism or the workpiece since the bi-directional rotation of all of the components via knob 104 is independent of and does not disturb the indexed angular relationship fixed between spindle 22 and indexing plate 62. This manner of operation was not possible using the conventional indexing arrangement used by the prior art.

I claim:

1. An indexing mechanism for a spindle having one end adapted to releasably grip a tool and rotationally supported within a work-head housing; and a second end comprising, in combination, a) an indexing housing fixed to said second end of said spindle and rotatably mounted about the axis of a shaft different from said spindle extending through said indexing housing parallel to the axis of rotation of said spindle;

b) an indexing plate having a circumferentially extending outer surface provided with a plurality of recesses spaced from one another about said outer surface; said plate being mounted in said housing in fixed rotational relationship to said shaft;

c) an indexing finger mounted in a fixed position on said indexing housing and including an end portion biased for selective releasably fixed, sequential engagement with said recesses in said indexing plate upon rotation of said indexing housing relative said indexing plate in a first rotational direction to releasably fix the rotational angular relationship between said indexing plate and said spindle, said finger and said recesses being conformed to prevent rotation of said indexing housing relative to said indexing plate in a second rotational direction opposite said first direction;

d) a rotary actuator mounted in a fixed position adjacent said work-head housing and operatively connected to one end of said shaft for preventing rotation of said shaft independent of rotation of said actuator, whereby rotation of said actuator causes rotation of said shaft, said indexing plate, said indexing housing and said spindle as a unit.

2. The mechanism defined in claim 1 wherein said rotary actuator includes a worm wheel fixed to said one end of said shaft and having an axis of rotation parallel to the axis of rotation of said shaft and a worm gear engaging said worm wheel and having an axis of rotation generally perpendicular to the axis of rotation of said worm wheel.

3. The mechanism defined in claim 2 further comprising, a measuring gage associated with said worm gear to indicate the circumferential length of travel of said shaft fixed to said worm wheel.

4. An indexing and feed control apparatus for grinding relief-form tooling comprising in combination;

a) a work-head housing including a longitudinally extending bore and a spindle mounted for rotation in said bore, said spindle including a first end conformed to releasably grip a workpiece and an opposing second end;

(b) an indexing mechanism including 1) an indexing housing fixed to said spindle;

2) a shaft extending through and rotatably receiving said indexing housing along an axis generally parallel to the axis of rotation of said spindle, said shaft including a first and second end;

3) an indexing member mounted in association with said indexing housing and connected to said shaft for rotation with said shaft, said indexing member having a circumferentially extending outer surface provided with a plurality of spaced recesses;

4) an indexing finger fixed to said indexing housing for releasable, biased engagement with a respective one of said recesses in said indexing member upon a predetermined degree of rotation of said indexing housing about said shaft in one radial direction;

5) a worm wheel fixed to the second end of said shaft having an axis of rotation parallel to the axis of rotation of said shaft; and 6) a worm gear fixedly mounted adjacent to said work-head housing for rotation about an axis generally perpendicular to the axis of rotation of said worm wheel and engaging said worm wheel to effect simultaneous rotation of said worm wheel, said shaft, said indexing housing and said spindle in either one of opposing rotational directions as a unit about the axis of rotation of said shaft without changing the indexed relationship between said indexing plate and said spindle determined by said engagement of said indexing finger and one of said recesses of said indexing member.

5. In combination with a work-holding spindle rotatably mounted in a work head housing, an indexing mechanism comprising:

a) an indexing plate fixed to a shaft different from the spindle and supported in spaced relationship to said spindle, said shaft having an axis of rotation generally parallel to the axis of rotation of said spindle, said indexing plate provided with a peripheral surface having a plurality of outward facing recesses circumferentially spaced from one another;

b) an indexing housing generally surrounding said outwardly facing recesses of said indexing plate and mounted for rotation about said shaft, said indexing housing being fixed to one end of said spindle;

c) an indexing finger mounted in a fixed circumferential position on said indexing housing and including an end portion biased toward said recesses for releasable engagement with a respective one of said recesses upon rotation of said indexing housing relative to said indexing plate in one rotational direction, said finger being conformed to be received in said recesses to prevent rotation of said indexing housing relative to said indexing plate in a second opposite rotational direction; and e) rotary actuator means fixed to an end of said shaft for simultaneously rotating said shaft, said indexing plate, said indexing housing, and said spindle as a unit without disengaging the biased engagement between said indexing finger and said indexing plate.

* * * * *